Aug. 21, 1962  J. F. LIST  3,049,813
MOTOR DRIVEN GLOBE
Filed June 23, 1961
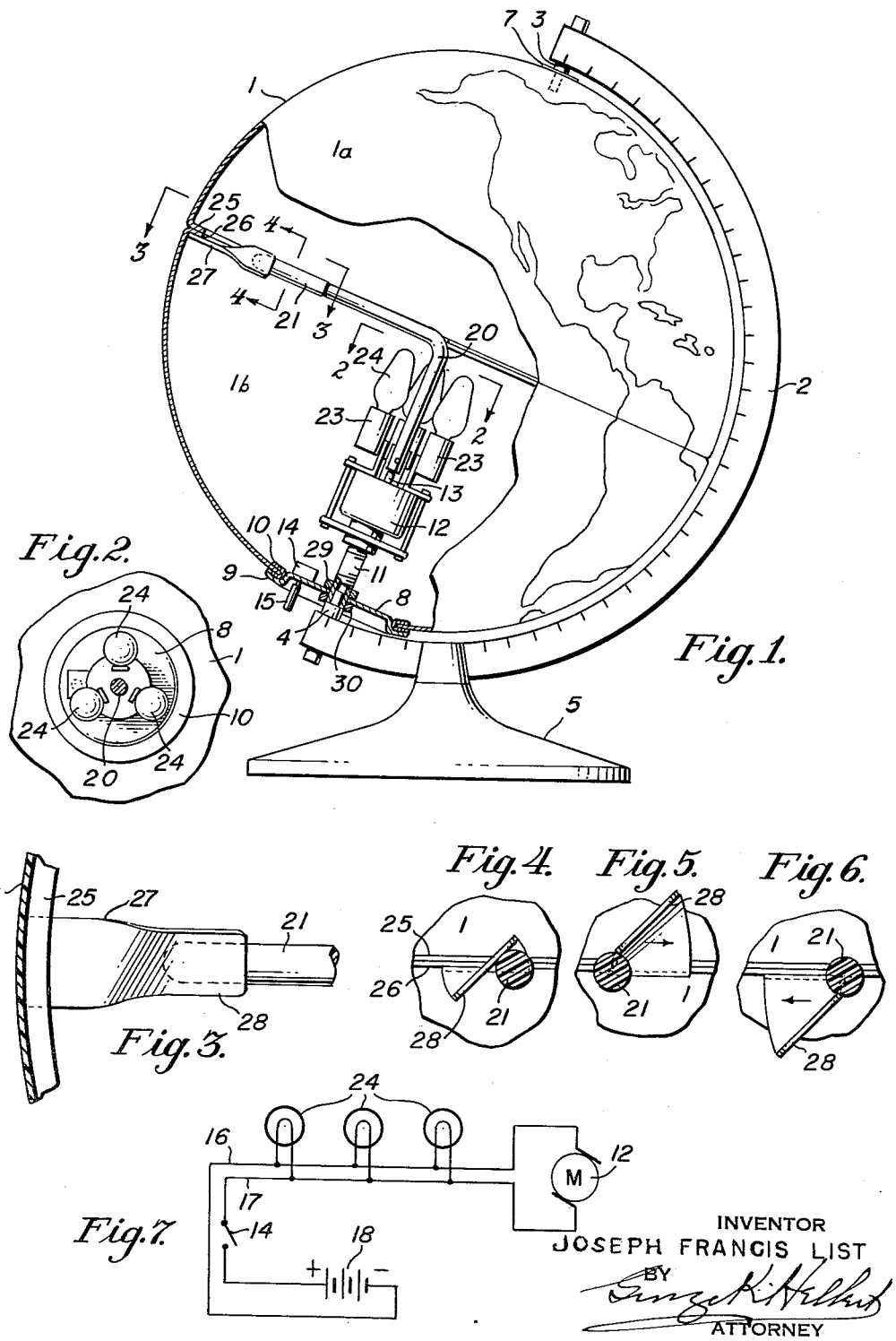
INVENTOR
JOSEPH FRANCIS LIST
BY
ATTORNEY 3,049,813
MOTOR DRIVEN GLOBE
Joseph Francis List, Riverton, N.J., assignor to Aero Service Corporation, Philadelphia, Pa., a corporation of Pennsylvania
Filed June 23, 1961, Ser. No. 119,119
8 Claims. (Cl. 35—46)

This invention is directed to the provision of novel mechanism for rotating a hollow terrestrial globe, orrery or the like to simulate the natural rotation on its axis of the body represented.

Many such globes are made from thermoplastic sheets formed to complementary hemispherical shape and often in relief to demonstrate relative altitudes of land masses depicted on the globe surface usually in contrasting colors; hence if the sheets are translucent a light can be mounted within the globe to facilitate examination of the data on its outer surface, emphasize color contrasts in different areas and enhance the decorative appearance of the globe which is usually mounted for manual rotation on an axis disposed angularly to the vertical when the means supporting the globe proper are resting on a horizontal surface. But as far as I am aware no satisfactory simple mechanical mechanism for turning a so-mounted globe in its supporting means continuously and at a substantially constant rate to thereby simulate the rotative motion of the earth has been available and, moreover, one of such character as to permit manual overriding of the normal action of the driving means without injury to the latter when it is desired to speed up, slow down or stop the movement of the globe.

It is therefore a principal object of the present invention to provide in combination with a hollow globe or the like mechanism for continuously rotating it at a constant speed in simulation of the natural rotation of the body it represents while permitting its movement to be manually accelerated, slowed or interrupted without imposing undue strain on the mechanism.

A further object is to provide means disposable within a hollow translucent globe for transmitting motion from an actuating element to the globe itself without casting shadows on its interior noticeable from without when the globe is internally illuminated.

Still further objects are the provision of globe rotating mechanism which when assembled with the globe is enclosed within it and hence substantially invisible from its exterior; which does not prevent or interfere with observation of the exterior of the globe in the customary way; with which means for illuminating the interior of the globe readily may be associated, and which permits manual actuation of the globe whenever desired.

Other objects, purposes and advantages of the invention will hereinafter more fully appear or be understood from the following description of a preferred embodiment of it illustrated in the accompanying drawing in which:

FIG. 1 is a side elevation, partially broken away, to show internal construction;

FIG. 2 is a fragmentary sectional view on line 2—2 in FIG. 1;

FIG. 3 is an enlarged fragmentary section on line 3—3 in FIG. 1 showing in detail coupling means utilized to transmit rotative motion to the globe;

FIG. 4 is an enlarged fragmentary section on line 4—4 in FIG. 1 comprising another view of said coupling means;

FIGS. 5 and 6 are, respectively, views similar to FIG. 4 but showing different relationships between the driving arm and the fin which it engages; and FIG. 7 is a conventional wiring diagram showing a convenient circuit for energizing the electrical elements employed.

Referring now more particularly to the drawing the term "globe" will be used generically herein to comprehend the entire structure illustrated in FIG. 1, including the hollow translucent sphere 1 mounted for rotation about its axis in a meridian segment 2 having coaxial pins 3, 4 projecting radially inwardly 180° apart, the segment being suported from a base 5 preferably circular in plan and permanently secured to it. Sphere 1 has at one pole, corresponding to the north polar region in a terrestrial globe, a grommet 7 receiving pin 3 while a circular plate 8 at a location corresponding to the south polar region carries a peripheral flange 9 on which a large annular grommet 10 crimped to the lower part of the sphere rests to provide a bearing on which the sphere is rotatable. Secured to the center of plate 8 is a tube 11 which supports a synchronous motor 12 having its main driving shaft 13 coaxial with pins 3, 4 and extending upwardly from the motor toward the center of the sphere, the lower end of tube 11 receiving the reduced end of pin 4 on segment 2. A switch 14 having a knurled actuating knob 15 projecting below the plate is also fixed to the latter in any convenient way and conductors 16, 17 (FIG. 7) are connected through this switch to the motor and to an external power source typified by the conventionally indicated battery 18. Extending upwardly from the main shaft 13 of motor 12 is a driving arm 20 which is bent laterally substantially into the equatorial plane of sphere 1 and in the embodiment shown carries at its outer end a transparent finger 21 the purpose of which will hereafter appear, although if preferred the arm and finger may be made of transparent material as an integral unit.

Mounted on the upper part of the housing of motor 12 are a plurality of electrical sockets 23 receiving incandescent lamps 24 rated to operate at the same voltage as motor 12 and connected in parallel in the same circuit with it through switch 14 whereby when motor 12 is running the lamps are energized to illuminate the interior of the sphere. Utilization of a plurality of lamps is advantageous in that it minimizes the density of and usually substantially eliminates shadows cast by driving arm 20 on the inner surface of the sphere and thus renders them virtually imperceptible from without, but a single lamp, or any desired number of them may be employed, or all internal illumination may be omitted if desired.

Sphere 1 is preferably formed in two hemispheres 1a and 1b with radially inwardly directed cooperative flanges 25, 26 at their equatorial edges which may be cemented together or formed to interlock with or without cement as, for example, in the manner of the hemispheres of the globe disclosed in the copending application of Charles H. Snyder, Serial No. 74,263, filed December 7, 1960. In accordance with the present invention there is secured to one of these flanges a plastic fin 27 comprising a preferably rectangular strip cut from flexible desirably transparent colorless thermoplastic polyvinyl chloride sheet .015" to .060" thick, such as "Vinylite" marketed by Union Carbide Corporation of New York, N.Y. The strip, depending on the dimensions of other parts, may be from ¼" to 2" wide and 1" to 5" long in a 12" globe and, before it is secured to the flange, is heated mildly and twisted through about 45°–60° so when one end is cemented flat to the flange the other projects inward and presents an angular blade portion 28 against which finger 21 can impinge as it revolves about the sphere axis in synchronism with motor shaft 13 so as to carry the sphere with it when the latter is free to move (FIG. 4) and thereby simulate the rotation of the earth when the sphere represents the latter.

Finger 21 being preferably made of a transparent clear relatively rigid plastic of the acrylic type such as "Lucite" marketed by E. I. du Pont de Nemours Co., of Wilmington, Del., or "Plexiglas" marketed by Rohm & Haas Co., of Philadelphia, Pa., does not cast on the sphere an appreciable shadow visible from its exterior and the fin, being likewise clear and transparent, also obstructs little or none of the light from the lamps.

There are illustrated in FIGS. 4, 5 and 6 three several conditions of relationship of the finger and fin viewed as sections on line 4—4 in FIG. 1, FIG. 4 showing the normal driving one in which finger 21 bears against the angular and flexible blade portion 28 of the fin. When the mechanical rotation of the sphere is manually slowed, interrupted or reversed the blade is flexed as the motor actuated finger continues moving and passes under the blade as indicated in FIG. 5 to again contact the blade (FIG. 4) during its ensuing revolution. If the sphere has then been released the finger resumes its drive or if it has not been released passes again under the blade and continues its movement.

If rotation of the sphere is manually accelerated for a partial revolution while it is being driven from the finger the fin merely moves away from the latter but if it is pushed ahead of the finger for more than a revolution or when the finger is at rest the fin blade is merely depressed, as illustrated in FIG. 6, until cleared by the finger and without injury to either part.

It is a marked advantage of this drive coupling between the finger and fin and hence between the motor and sphere that it is not a positive one and consequently that no special precautions for the protection of gears, motor or other parts are required when it is desired manually to turn the sphere in either direction, change its speed or interrupt its mechanical rotation which last is automatically resumed upon release of the sphere, either immediately if it is freed just as the finger comes into contact with the fin or within the period of a single revolution of the finger if the latter at the moment of release is at some other point in its orbit.

Plate 8 is operatively fixed to tube 11 in any convenient way as by nuts 29, 30 threaded on the tube above and below the plate and normally the friction between flange 9 and grommet 10 is insufficient when the sphere is being turned by hand to correspondingly turn the plate about pin 4 while of course when the sphere is being mechanically driven no forces tending to turn these parts relatively to each other are resolved against either of them.

By reason of the inherent resiliency of the sphere it may be readily inserted in or removed from the meridian segment 2 by manually compressing it adjacent one or both poles sufficiently to clear it from the pins in the segment.

Obviously when the sphere constitutes a terrestrial globe it is preferable the direction of revolution of the finger in its orbit correspond to the direction of rotation of the earth, but the coupling effect of the finger and fin may be utilized in identical manner with a motor driving its shaft in the opposite direction, i.e., clockwise, instead of counterclockwise when viewed as in FIG. 2, while the motor if of constant speed type is of course designed to impart the desired rotative speed to the sphere, for example, one revolution per minute.

It will be recognized that the circuit conventionally diagrammed in FIG. 7 embodies conductors 16, 17 and branch leads therefrom which for convenience of illustration are not shown in FIG. 1, as it is of no moment where they are positioned provided they interconnect the several electrical elements in the manner represented in FIG. 7 or otherwise, as preferred. Thus if desired separate circuits for the motor and illuminating elements each under control of its own switch can be provided or the circuit be arranged to produce special effects, for example by employing a variable speed motor and controller therefor which would permit the rotational speed of the sphere to be varied; likewise, colored, translucent or other lamps may be used to illuminate the interior of the sphere.

It will therefore be understood that while the embodiment of the invention illustrated and herein described is at present a preferred one the changes first suggested and others in the design, construction, arrangement and relationship of the several elements which may occur to those skilled in the art may be made if desired without departing from the spirit and scope of the invention as defined in the appended claims.

Having thus described my invention, I claim and desire to protect by Letters Patent of the United States:

1. A globe comprising a substantially spherical hollow body, means supporting the body for rotation about a fixed axis, a prime mover disposed in the body, a finger associated with the prime mover for rotation thereby in an orbit normal to said axis and a flexible fin projecting inwardly in the body into the path of the finger for engagement thereby in its orbital travel about said axis.

2. A globe comprising a substantially spherical hollow body, means supporting the body for rotation about a fixed axis, a finger movable in the body in an orbit lying in a plane normal to said axis, means for moving said finger in said orbit, a flexible fin projecting inwardly in the body substantially in said plane having a portion disposed angularly to said plane engageable by said finger to turn the body but adapted to be yieldably diverted from said plane by the finger during relative movement between said portion and the finger.

3. A globe comprising a substantially spherical hollow body, means supporting the body for rotation about a fixed axis, illuminating means disposed within the body, a prime mover in the body, a finger mounted for rotation thereby about said axis and a flexible fin projecting inwardly in the body in the path of the finger for engagement thereby in its travel about said axis.

4. A globe as defined in claim 3 in which the finger and fin are transparent and colorless.

5. A globe as defined in claim 3 in which the illuminating means comprise a plurality of light sources spaced about the body axis.

6. A globe comprising a substantially spherical hollow body, a meridian element, means associated therewith including a circular plate forming a bearing for the body supporting the latter for rotation about a fixed axis, a motor within the body above the plate with its shaft coincident with said axis, a member carried by the shaft providing a finger extending normal thereto, a fin of yieldable material fixed to the body and projecting into the path of said finger as it rotates with the shaft to thereby through engagement of the finger with the fin cause the body to follow the movement of the finger whenever the resistance of the body and associated parts in opposition thereto is less than that afforded by the yieldable fin.

7. A globe comprising a substantially spherical hollow body having diametrically opposed circular openings, a meridian element, a pin proximate one end thereof engaging in one opening, a circular plate proximate the other end of the element forming a seat for the marginal edge of the body about the other opening, a motor, means supporting it within the body in axial alignment with the pin and plate, an L-shaped arm having driving connection with the motor shaft and extending in part substantially normal thereto, a fin of yieldable material fixed to and projecting inwardly from the body into the path of rotation of the arm operative when engage by the latter to transmit its movement to the body and correspondingly turn the body on the plate as long as the inherent stiffness of the fin suffices to maintain it in normal position against resistance to rotation offered by the body and associated parts, the fin moving out of such position to terminate said engagement and allow the arm to pass the fin whenever said resistance exceeds a predetermined value.

8. A globe comprising a substantially spherical hollow body having diametrically opposed circular openings of different diameters, a meridian element, a pivot pin adjacent the upper end thereof entering the smaller opening, means proximate and supported from the other end of the element affording a bearing for the perimetral portion of the body about the other and larger opening, a motor within the body axially aligned with the openings, means operable by the motor to traverse a circular orbit about its axis and other means projecting inwardly from the body into said orbit for engagement by said traversing means to thereby rotate the body, the latter removable from the meridian element and parts supported thereby by disengagement from the pin and subsequent passage of the motor and traversing means through the larger opening.

References Cited in the file of this patent

UNITED STATES PATENTS

| | | |
|---|---|---|
| 1,659,810 | Damoff | Feb. 21, 1928 |
| 2,333,475 | Dupler | Nov. 2, 1943 |
| 2,434,250 | Rebus | Jan. 13, 1948 |